United States Patent [19]

Binder

[11] Patent Number: 5,093,978

[45] Date of Patent: Mar. 10, 1992

[54] MANIPULATOR FOR TOOLS AND TOOL ADAPTERS

[75] Inventor: Rolf Binder, Mönchengladbach, Fed. Rep. of Germany

[73] Assignee: Werner und Kolb Werkzeugmaschinen GmbH, Berlin, Fed. Rep. of Germany

[21] Appl. No.: 560,602

[22] Filed: Aug. 1, 1990

[30] Foreign Application Priority Data

Aug. 2, 1989 [DE] Fed. Rep. of Germany ....... 3925567

[51] Int. Cl.⁵ ............................................ B23Q 3/155
[52] U.S. Cl. ..................................... 29/568; 414/751; 901/16; 901/29
[58] Field of Search .................... 29/568; 901/16–18, 901/29; 414/751

[56] References Cited

U.S. PATENT DOCUMENTS 4,132,318  1/1979  Wang et al. ..................... 901/16 X

FOREIGN PATENT DOCUMENTS

| 310128 | 9/1988 | European Pat. Off. | |
| 237807 | 7/1986 | German Democratic Rep. | ... 29/568 |
| 54044 | 3/1982 | Japan | ..................... 29/568 |
| 79934 | 4/1987 | Japan | ..................... 29/568 |
| 2075893 | 11/1981 | United Kingdom | ................. 29/568 |

*Primary Examiner*—Steven C. Bishop
*Attorney, Agent, or Firm*—Peter K. Kontler

[57] ABSTRACT

A manipulator for material removing tools and their adapters, particularly in machine tools and matching centers, has a horizontal rail for a reciprocable carrier which supports an elongated vertical holder which is movable up and down and the lower end of which carries one end of a horizontal link. The link is turnable relative to the holder about a vertical axis and its other end supports an arm which is turnable about a vertical axis and supports two tongs. The tongs are angularly offset relative to each other by 180° about the horizontal axis and at least one jaw of each tongs is movable relative to the other arm in the direction of the horizontal axis. The movements of the carrier, holder, link, arm and movable jaws are regulated by numerical controls.

12 Claims, 4 Drawing Sheets

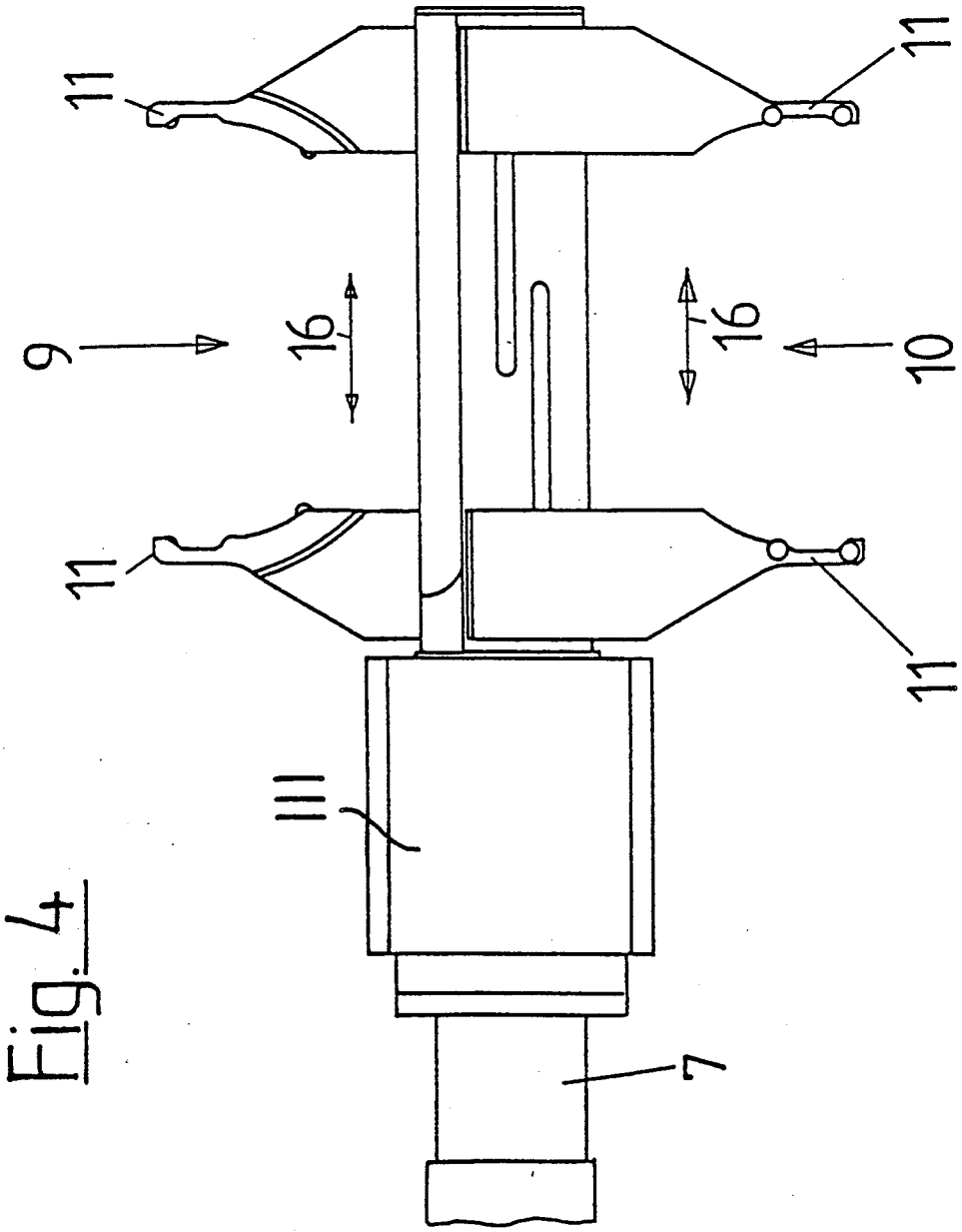

MANIPULATOR FOR TOOLS AND TOOL ADAPTERS

CROSS-REFERENCE TO RELATED CASE

The manipulator of the present invention can be used in machining centers of the type disclosed in commonly owned copending patent application Ser. No. 07/560,610 filed Aug. 1, 1990 for Machining Center.

BACKGROUND OF THE INVENTION

The invention relates to machine tools and machining centers in general, and more particularly to improvements in machine tools and machining centers (which can contain one or more material removing machine tools) wherein tools are stored in magazines and must be shuttled between their magazines and the locale or locales of use, e.g., between the magazines(s) and one or more horizontal, vertical or otherwise inclined tool spindles. Still more particularly, the invention relates to improvements in manipulators for tools, i.e., to devices which can transport tools between their magazine(s) and the work treating station or stations.

The majority of conventional manipulators are designed for use in a single machine tool, e.g., in a vertical boring or drilling machine or in a horizontal boring or drilling machine. Moreover, conventional manipulators are designed for transport of tools only; thus, they are not suitable for the shuttling of adapters for tools.

Published European patent application No. 0 310 128 discloses a tool changer which can deliver tools to and from horizontal as well as to and from vertical tool spindles. However, the tool changer is not capable of transporting adapters for tools, and the tools which are to be transported by such tool changer must all have identical stubs, sockets or like parts which are to be engaged by the tool changer.

OBJECTS OF THE INVENTION

An object of the invention is to provide a manipulator which is more versatile than heretofore known manipulators.

Another object of the invention is to provide a manipulator which can be used as a tool changer or as a changer for adapters for tools of numerous sizes and/or shapes.

A further object of the invention is to provide a machine, such as a machine tool, which employs one or more manipulators of the above outlined character.

An additional object of the invention is to provide a manipulator which can be used in a machine with a horizontal or with a vertical tool spindle as a means for shuttling tools and/or adapters for tools between the tool spindle or spindles and one or more magazines for tools and/or adapters.

Still another object of the invention is to provide the manipulator with means for simultaneously or alternately gripping and transporting identical or different tools and/or adapters for tools.

A further object of the invention is to provide a manipulator which can be installed in existing material removing and/or other machines or machining centers as a superior substitute for heretofore known manipulators.

Another object of the invention is to provide a manipulator which can be automated to a desired degree and the movements of which can be regulated by the numerical controls of the machine or machining center.

An additional object of the invention is to provide a novel and improved method of manipulating tools and adapters for tools in machine tools and machining centers.

A further object of the invention is to provide a manipulator which can exchange tools and/or adapters for tools within a fraction of time that is necessary to carry out similar operations with heretofore known tool changers.

SUMMARY OF THE INVENTION

The invention is embodied in a manipulator for tools and adapters, particularly for material removing tools and adapters for such tools in machine tools and machining centers. The improved manipulator comprises a support (e.g., an elongated rail) which defines a first elongated path, a carrier which is mounted on the support for movement along the first path and defines a second elongated path extending substantially at right angles to the first path, an elongated holder mounted on and movable relative to the carrier along the second path, a link having a first end mounted on one end of the elongated holder for angular movement about a first axis, an arm mounted on the second end of the link for angular movement about a second axis which is substantially normal to the first axis, and adjustable gripper means on the arm.

One of the paths (e.g., the first path) is or can be substantially horizontal, and the other path is or can be substantially vertical. One of the axes (e.g., the first axis) is or can be substantially vertical, and the other axis is or can be substantially horizontal.

The gripper means can comprise a plurality of adjustable tongs which are angularly offset relative to each other with reference to the second axis. For example, the gripper means can include two tongs which are angularly offset relative to each other by 180°. At least one of the tongs preferably comprises a first jaw or claw and a second jaw or claw, and at least one of the jaws or claws is movable along the arm relative to the other jaw in the direction of the first axis.

The link is preferably mounted at the lower end of the holder.

The manipulator further comprises means for moving the carrier and the holder along the respective paths, means for turning the link and the arm about the respective axes, and means for moving the at least one jaw relative to the other jaw, and numerical controls for the moving and turning means.

For example, the means for moving the carrier can comprise a rack and pinion drive, and the means for moving the holder can comprise a feed screw or vice versa.

The novel features which are considered as characteristic of the invention are set forth in particular in the appended claims. The improved manipulator itself, however, both as to its construction and its mode of operation, together with additional features and advantages thereof, will be best understood upon perusal of the following detailed description of certain presently preferred specific embodiments with reference t the accompanying drawing.

BRIEF DESCRIPTION OF THE DRAWING

FIG. 4 is an enlarged side elevational view of the arm and gripping means in the manipulator of FIG. 3; and FIG. 5 is an end elevational view of the arm and gripping means.

DESCRIPTION OF PREFERRED EMBODIMENTS

Figure 1:
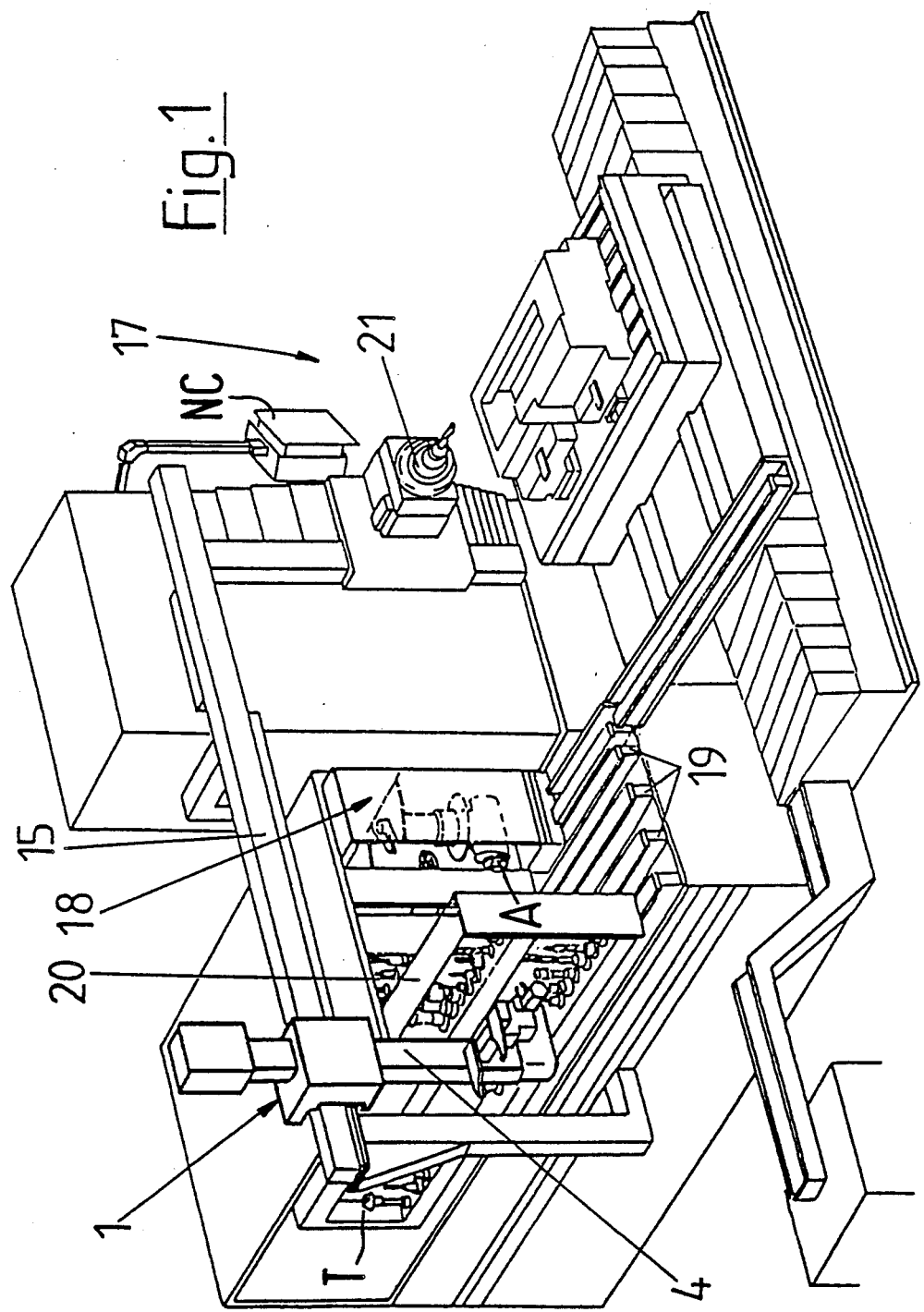
FIG. 1 is a perspective view of a machine tool with a horizontal tool spindle, magazines for material removing tools and adapters, and a manipulator which embodies the invention and serves to shuttle tools and/or adapters, between the spindle and the respective magazines.

FIG. 1 shows a machine tool which employs a horizontal tool spindle 21. This machine tool (hereinafter called machine or material removing machine) can form part of a machining center with two or more machines, e.g., the machine of FIG. 1 and the machine of FIG. 2 which latter is a portal type machine and employs a vertical tool spindle 21'.

Figure 2:
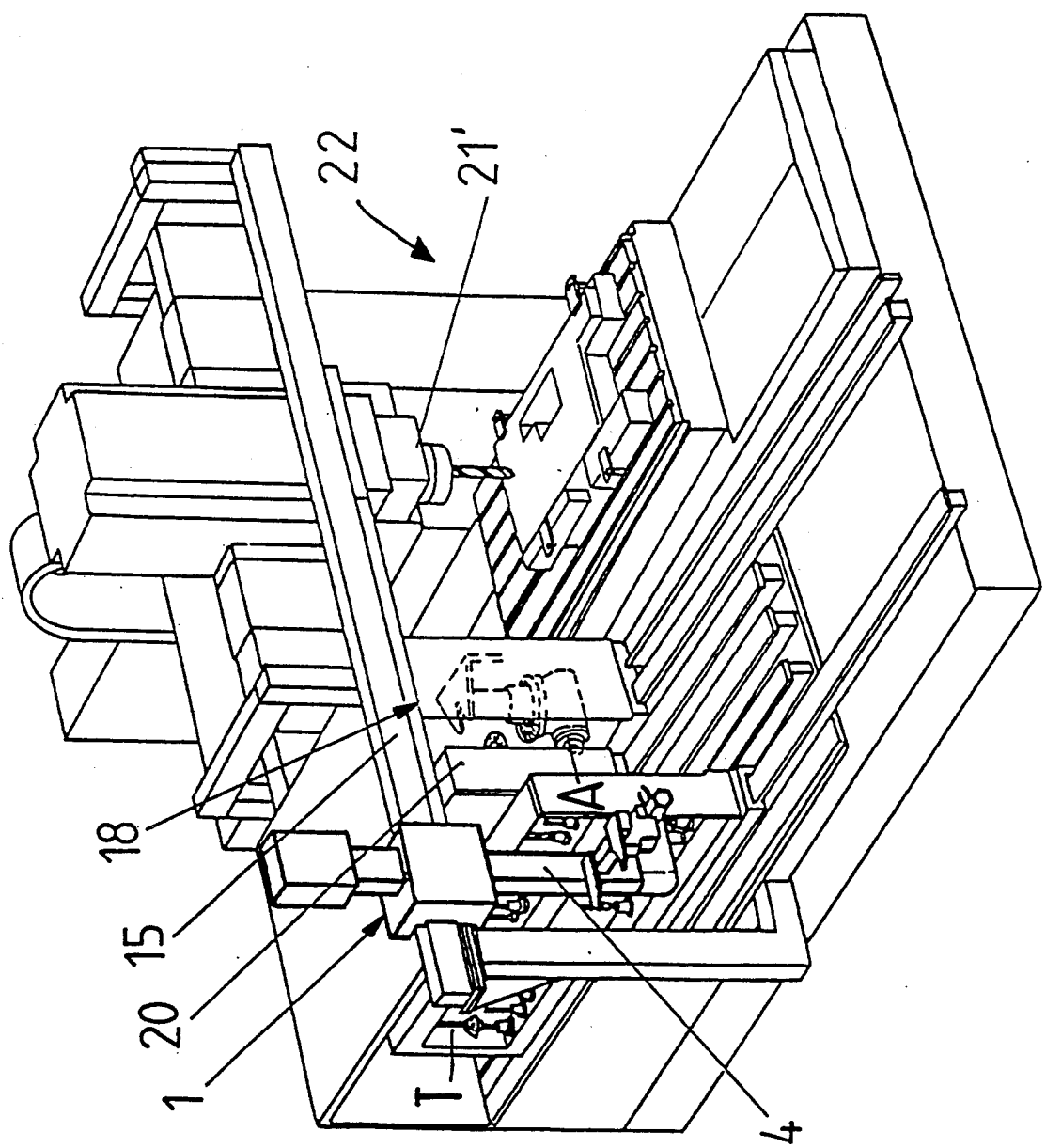
FIG. 2 is a similar perspective view of a machine tool with a vertical tool spindle, magazines for material removing tools and adapters, and a manipulator which embodies the invention and serves to shuttle tools and/or adapters between the spindle and the respective magazines.

The improved tool changer or manipulator 1 of FIG. 1 or FIG. 2 serves to shuttle tools and/or adapters for tools between one or more magazines and the material removing station (shown at 17 in FIG. 1 and at 22 in FIG. 2). The station 17 of FIG. 1 is adjacent one or more magazines 18 (one shown) for adapters A and one or more magazines 20 for tools T. FIG. 1 shows that the magazines 18, 20 are reciprocable along guide rails 19 extending in parallelism with the horizontal axis of the spindle 21. The illustrated magazine 18 for adapters A is located between the magazines 20 for the tools T and the material removing station 17.

Figure 3:
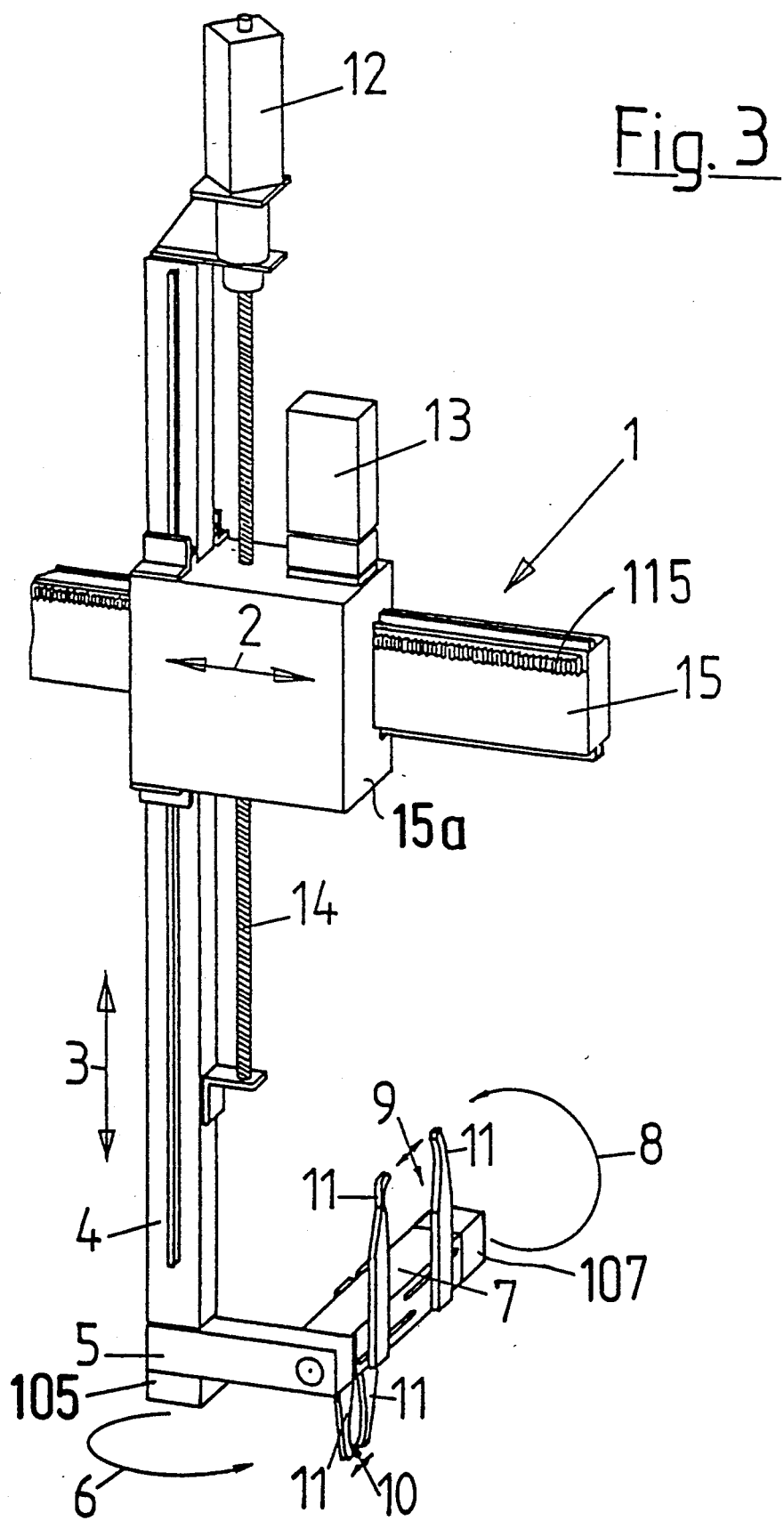
FIG. 3 is an enlarged perspective view of the manipulator.

The details of a presently preferred embodiment of the manipulator 1 are shown in FIGS. 3, 4 and 5. This manipulator comprises a stationary or mobile support 15 in the form of an elongated horizontal rail which is secured to or forms part of the machine frame and extends at right angles to the horizontal axis of the tool spindle 21 as well as at right angles to the vertical axis of the tool spindle 21'. The manipulator 1 of FIGS. 1 and 3–5 is or can be identical with the manipulator of FIG. 2 and, therefore, the parts of the manipulator of FIG. 2 are denoted by the same reference characters as the parts of the manipulator of FIGS. 1 and 3–5. In FIG. 2, the magazine 18 is again disposed between the magazines 20 and the material removing station.

The support or rail 15 has a toothed rack 115 forming part of means for moving a carrier 15a of the manipulator 1 back and forth (note the double-headed arrow 2) along a horizontal path in front of and above the spindle 21' of FIG. 2 and above the spindle 21 of FIG. 1. The means for moving the carrier 15a further comprises a reversible motor 13 which drives a pinion defines a vertical path for an elongated holder 4 which is movable up and down (note the double-headed arrow 3) by a rotary feed screw 14 driven by a reversible motor 12 at the upper end of the holder 3 and meshes with a nut (not shown) in the carrier 15a. The lower end portion of the holder 4 turnably mounts one end of a link 5 which can be turned in and counter to the direction of arrow 6 by a motor 105. The link 5 is substantially horizontal and is turnable (arrow 6) about a vertical axis, namely about an axis which is parallel to the vertical path for the holder 4. The other end of the link 5 turnably supports one end of a horizontal arm 7 for two gripping devices or tongs 9 and 10. The arm 7 is turnable (arrow 8) about a horizontal axis (i.e., about an axis which is normal to the axis of the link 6) by a further motor 107.

The gripping devices 9, 10 are angularly offset by 180° with reference to the horizontal axis of the arm 7, and each of these gripping devices comprises two jaws or claws 11 at least one of which is movable toward and away from the other jaw or claw 11 of the respective gripping device in the longitudinal direction of the arm 7, i.e., in the direction of the axis of rotation of the arm. The means for moving the jaws 11 longitudinally of the arm 7 (note the double-headed arrows 16 in FIG. 4) includes motors 111 one of which is shown in FIG. 4. The operation of some or all of the motors can be regulated by the numerical controls NC (shown in FIG. 1), depending on the desired degree of automation of the manipulator 1. The purpose of the manipulator 1 is to transport tools T and/or adapters A between the respective magazines and the spindle 21 or 21'. The tools T and/or adapters A can be held between the jaws 11 of the gripping device 9 and/or 10.

The arm 7 is turnable about its own horizontal axis as well as about the vertical axis of the link 5. In addition, the link 5 is movable up and down with the holder 4 as well as back and forth horizontally along the support or rail 15. This renders the gripping devices 9 and 10 sufficiently versatile to ensure that they can grasp and transport tools T and/or adapters A between the respective magazine or magazines and the material removing station 17 or 21. The gripping devices 9, 10 can transport tools having steeper or shorter cones or flanges of larger or smaller diameter.

It goes without saying that the improved manipulator can be used with advantage in machines or machining centers wherein the tool spindle or another tool- and/or adapter-receiving device is rotatable about an axis which is inclined to the horizontal as well as to the vertical. The path which is defined by the support 15 need not be exactly horizontal, and the path which is defined by the carrier 15a (for the holder 4) need not be exactly vertical but is preferably normal to the path for the carrier. The numerical controls NC render it possible to shuttle a selected tool T and/or a selected adapter A between the material removing station and the respective magazine within a short interval of time and in a fully or partly automatic way.

The manner of mounting the workpiece or workpieces which are to be treated in the machine of FIG. 1 or 2 or in a machining center which includes the machine of FIG. 1 and/or FIG. 2 forms no part of the present invention. Each of the gripping devices 9 and 10 is preferably designed to shuttle tools T of different sizes and/or shapes as well as to shuttle adapters A of different sizes and/or shapes.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A manipulator for tools and adapters, particularly for material removing tools and adapters for material removing tools in machine tools and machining centers, comprising a support defining a first path; a carrier mounted on said support for movement along said first path and defining a second path extending at right angles to said first path; an elongated holder mounted on and movable relative to said carrier along said second path; a link having a first end mounted on and turntable relative to one end of said holder about a first axis which is parallel to said second path, said link further having a second end; an arm mounted on and arranged to turn relative to the second end of said link about a second axis which is normal to said first axis; and adjustable gripper means on said arm.

2. The manipulator of claim 1, wherein one of said paths is substantially horizontal and the other of said paths is substantially vertical.

3. The manipulator of claim 2, wherein one of said axes is substantially horizontal and the other of said axes is substantially vertical.

4. The manipulator of claim 3, wherein said first path is substantially horizontal and said first axis is substantially vertical.

5. The manipulator of claim 1, wherein said gripper means includes a plurality of adjustable tongs which are angularly offset relative to each other about said second axis.

6. The manipulator of claim 5, wherein said tongs include first and second tongs which are angularly offset by substantially 180°.

7. The manipulator of claim 5, wherein at least one of said tongs comprises a first jaw and a second jaw, at least one of said jaws being movable along said arm relative to the other of said jaws in the direction of said second axis.

8. The manipulator of claim 1, wherein said holder has an upper end and a lower end and said one end is the lower end of said holder.

9. The manipulator of claim 1, further comprising means for moving said carrier and said holder along the respective paths and means for turning said link and said arm about the respective axes.

10. The manipulator of claim 9, further comprising numerical controls for said moving means and said turning means.

11. The manipulator of claim 9, further comprising means for moving said at least one jaw relative to said other jaw and numerical controls for said moving means and said turning means.

12. The manipulator of claim 9, wherein one of said moving means comprises a rack and pinion drive and the other of said moving means comprises a feed screw.

* * * * *